(12) United States Patent
Blouin

(10) Patent No.: US 9,221,432 B2
(45) Date of Patent: Dec. 29, 2015

(54) SNOW BRUSH

(71) Applicant: GARANT GP, Saint-Francois (CA)

(72) Inventor: Carl Blouin, Levis, CA (US)

(73) Assignee: GARANT GP, Saint-François (CA)

( * ) Notice: Subject to any disclaimer, the term of this patent is extended or adjusted under 35 U.S.C. 154(b) by 79 days.

(21) Appl. No.: 14/101,134

(22) Filed: Dec. 9, 2013

(65) Prior Publication Data

US 2014/0157536 A1 Jun. 12, 2014

Related U.S. Application Data

(60) Provisional application No. 61/735,175, filed on Dec. 10, 2012.

(51) Int. Cl.
- *B60S 3/04* (2006.01)
- *A46B 3/08* (2006.01)
- *A46B 9/00* (2006.01)

(52) U.S. Cl.
CPC . *B60S 3/045* (2013.01); *A46B 3/08* (2013.01); *A46B 9/005* (2013.01); *A46B 2200/3046* (2013.01)

(58) Field of Classification Search
CPC ............ B60S 3/045; A47L 1/06; A46B 9/005
See application file for complete search history.

(56) References Cited

U.S. PATENT DOCUMENTS

| | | | |
|---|---|---|---|
| 938,421 A | 10/1909 | Hakins | |
| 1,747,180 A | 2/1930 | Raynor | |
| 2,260,390 A | 10/1941 | Lorenz | |
| 2,284,528 A | 5/1942 | Malmquist | |
| 2,637,871 A | 5/1953 | Moser | |
| 2,915,768 A | 12/1959 | Hall | |
| 3,454,413 A * | 7/1969 | Miller | 427/224 |
| 3,717,898 A | 2/1973 | Jones | |
| 3,872,536 A | 3/1975 | Siemund | |
| 4,317,250 A | 3/1982 | Shutts | |
| 4,712,269 A | 12/1987 | Worthen | |
| 5,067,197 A | 11/1991 | Cormier | |
| 5,263,222 A | 11/1993 | Johnstone, II | |
| 5,588,176 A * | 12/1996 | Sixsmith | 15/322 |
| D391,714 S | 3/1998 | Kilander | |
| 5,813,728 A | 9/1998 | Zigerlig | |
| 6,038,794 A | 3/2000 | Kilander | |
| 6,243,906 B1 | 6/2001 | Holliday et al. | |
| 6,662,399 B1 | 12/2003 | Vairo | |
| 7,469,444 B1 | 12/2008 | Thomas | |
| 7,779,502 B2 * | 8/2010 | Fujiwara et al. | 15/229.4 |
| 7,824,182 B2 * | 11/2010 | Kim | 433/142 |
| 2005/0061793 A1 | 3/2005 | Deane, III | |
| 2006/0048324 A1 | 3/2006 | Vassilopoulos | |

FOREIGN PATENT DOCUMENTS

| | | |
|---|---|---|
| BE | 453539 | 1/1944 |
| DE | 19543164 A | 5/1997 |
| DE | 202011108127 U | 2/2012 |

\* cited by examiner

*Primary Examiner* — Shay Karls

(57) ABSTRACT

A snow brush, comprising flexible sheets secured by a first edge to a handle, all edges of the flexible sheets other than the first edge providing corresponding continuous brushing edges, wherein the flexible sheets are sheets of closed cells foams, and a method for fabricating the now brush, comprising selecting flexible sheets, securing a first edge of the flexible sheets to a handle, wherein selecting flexible sheets comprises selecting a number of sheets, and a thickness, a density and a free length of each sheet.

14 Claims, 19 Drawing Sheets

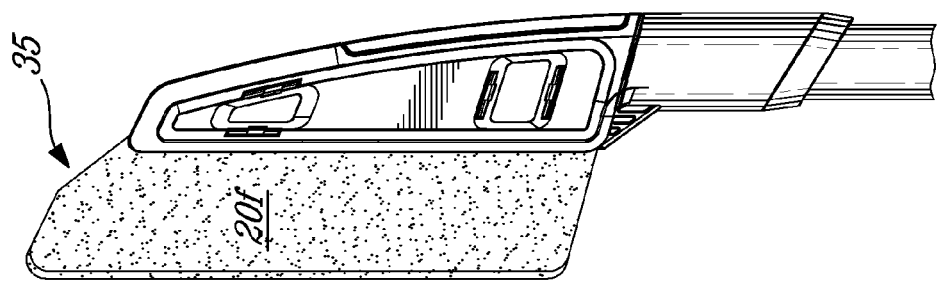
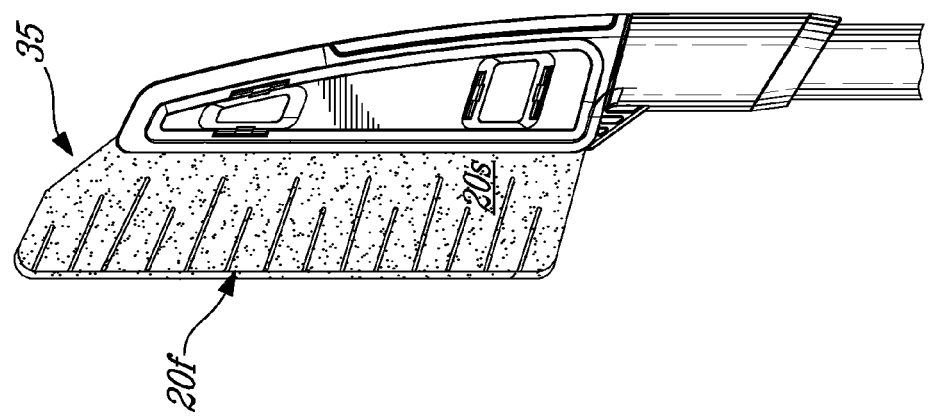

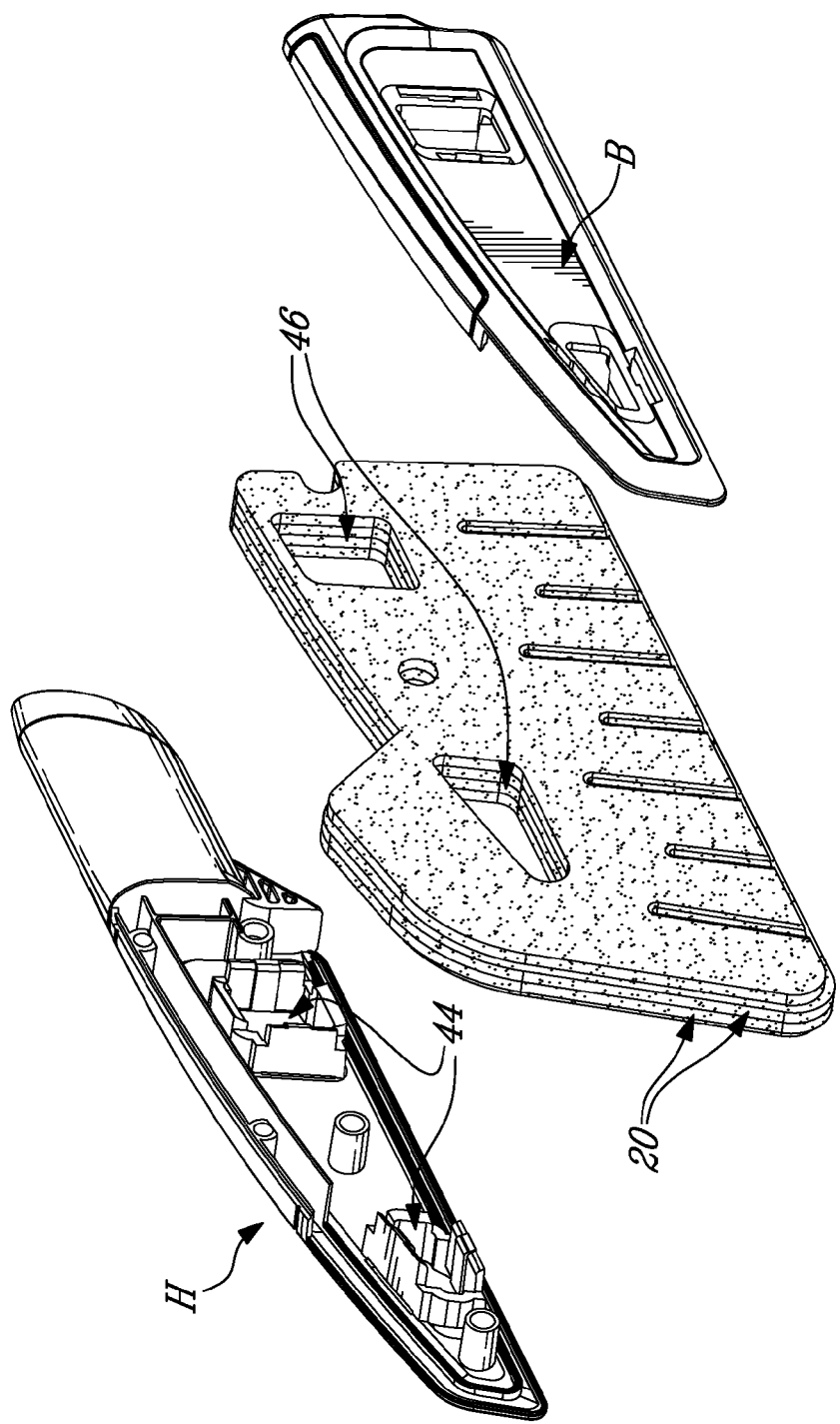

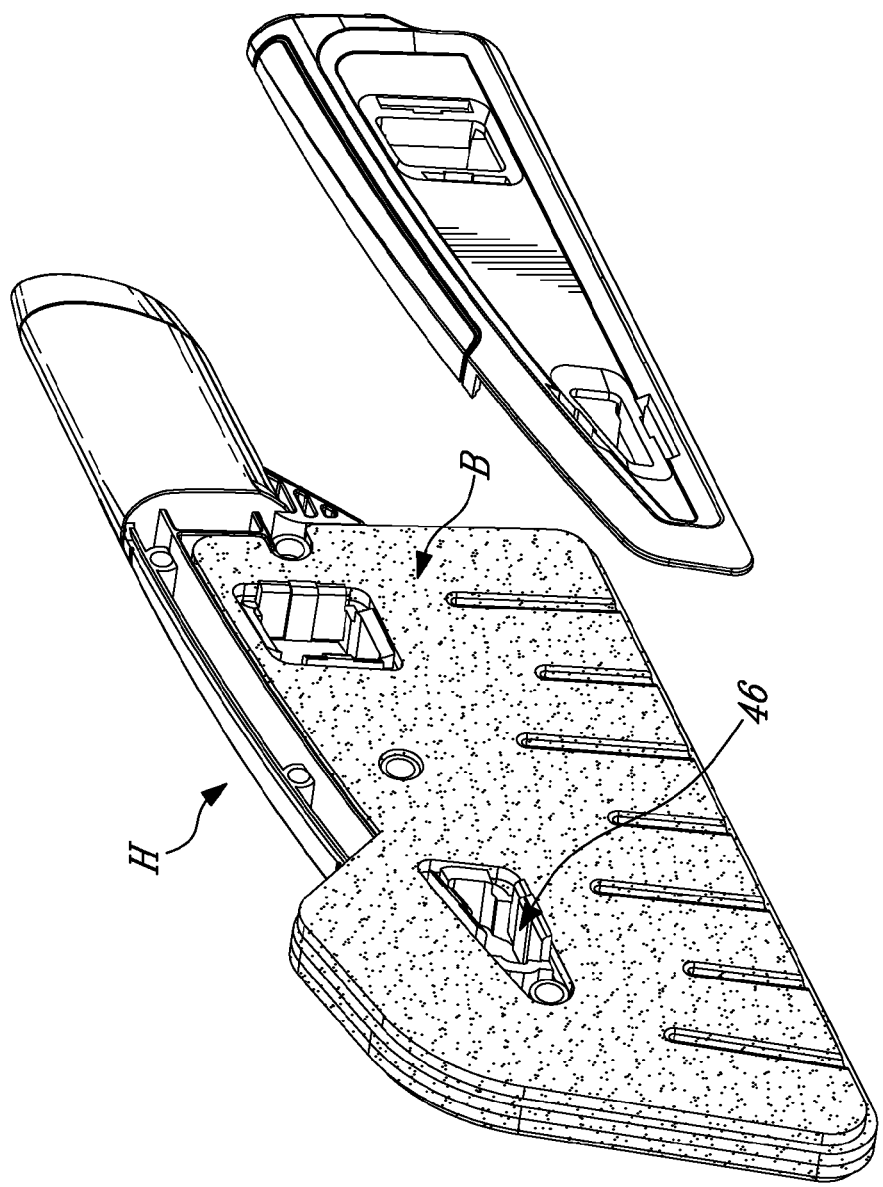

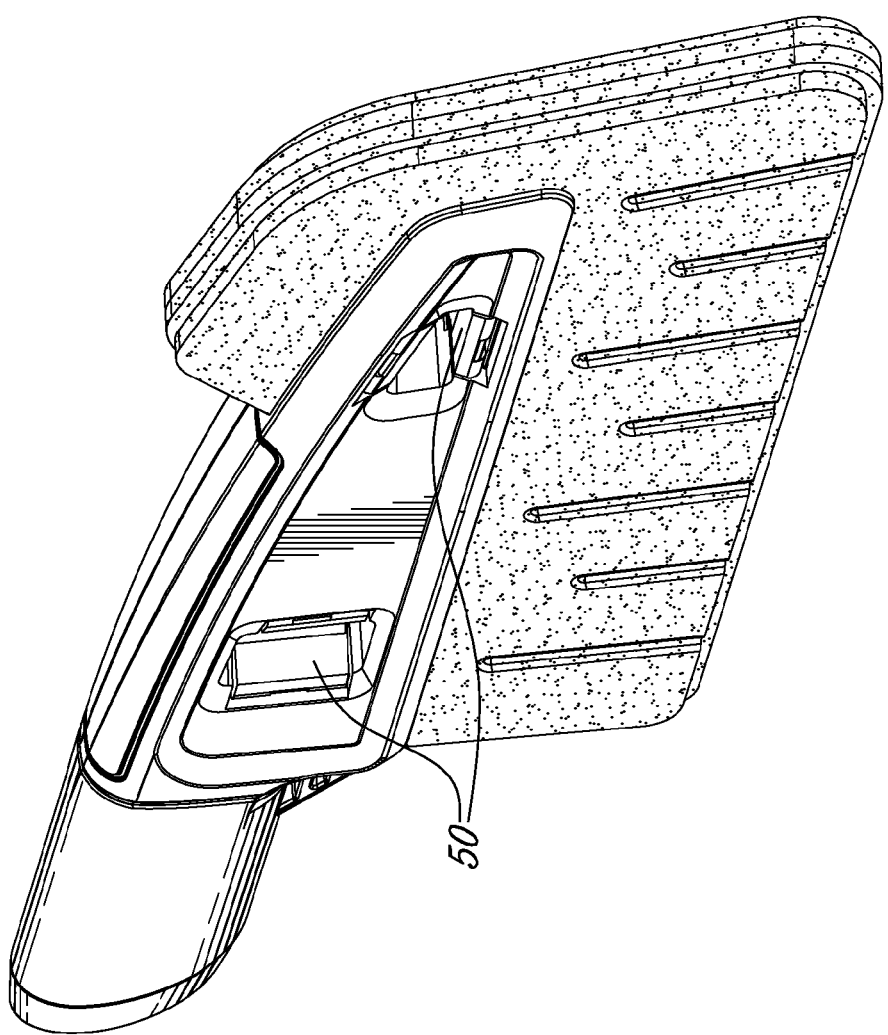

SNOW BRUSH

CROSS REFERENCE TO RELATED APPLICATIONS

This application claims benefit of U.S. provisional application Ser. No. 61/735,175, filed on Dec. 10, 2012. All documents above are incorporated herein in their entirety by reference.

FIELD OF THE INVENTION

The present invention relates to a snow brush.

BACKGROUND OF THE INVENTION

Bristles brushes used for removing snow on vehicles for example, although made of soft synthetic materials or natural materials are abrasive on the swept surfaces, and cause micro scratches. Bristles brushes tend to catch snow through the bristles, which then melts into water when the snow brush is stored within the vehicle, or may freeze back and form hard ice stuck through the bristles, which reduces the flexibility of the bristles, which become stiff due to the presence of ice between bristles and may then damage the car finish upon use.

Other snow removing tools have been provided in order to void micro scratches, comprising, instead of bristles, a molded foam-type head that can be used to pull or push the snow off the vehicle. Such brush heads suffer a lack of flexibility to adapt curved surfaces of the vehicle and cannot reach interstices and areas smaller than the head dimension (side mirrors, bottom of the windshield near the wipers, area under the spoiler . . . ).

There is still a need in the art for a brush for brushing snow off a vehicle surface without scratching the paint or harming the finish of the vehicle.

SUMMARY OF THE INVENTION

More specifically, in accordance with the present invention, there is provided a snow brush, comprising flexible sheets secured by a first edge to a handle, all edges of the flexible sheets other than the first edge providing corresponding continuous brushing edges, wherein the flexible sheets are sheets of closed cells foams.

There is further provided a method for fabricating a snow brush, comprising selecting flexible sheets, securing a first edge of the flexible sheets to a handle, wherein selecting flexible sheets comprises selecting a number of sheets, and a thickness, a density and a free length of each sheet.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIGS. 3a and 3b show other embodiments of a snow brush according to the present invention;

FIGS. 12a-12d are diagrammatic views of steps of a method for fixation of the sheets of the brush to a handle according to embodiments of the present invention.

DESCRIPTION OF EMBODIMENTS OF THE INVENTION

The present invention is illustrated by the following non-limiting examples.

The snow brush 10 comprises sheets of foam 20 extending from a handle (H). In the illustrated examples, the sheets are secured to the handle (H) by an edge of the sheets 20 and extend from the handle (H) to the brushing edge.

The material of the sheets is selected for its light weight, softness, flexibility, weather resistance, resistance to abrasion and tearing. Moreover, it is non-abrasive, so as to not damage the finish of the surface the brush is intended to be used on. Sheets of closed cells foams, such as EVA (ethylene-vinyl acetate) copolymer foams, polyethylene foams, rubber foams, TPE (thermoplastic elastomer) foams, silicone foams for example, are found to meet these requirements. Such material is composed of closed cells so it cannot absorb water. This allows the brush to keep its flexibility even after being completely dipped in and out of water and let to freeze. A thin layer of ice can appear on the surface of the foam sheets, but is very easily removed by bending the sheets in order to break this ice layer. This layer ice surface, if it occurs, is easily removed.

Figure 1:
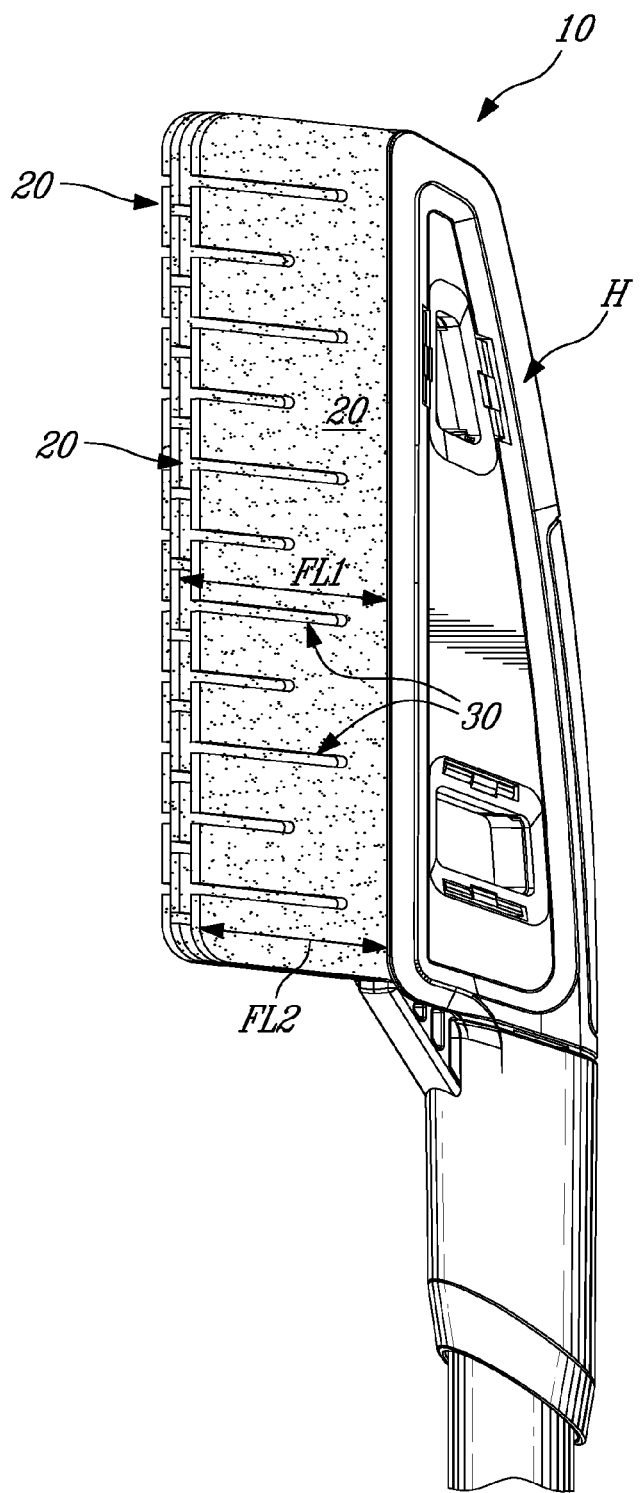
FIG. 1 shows a snow brush according to an embodiment of an aspect of the present invention.
Figure 2:
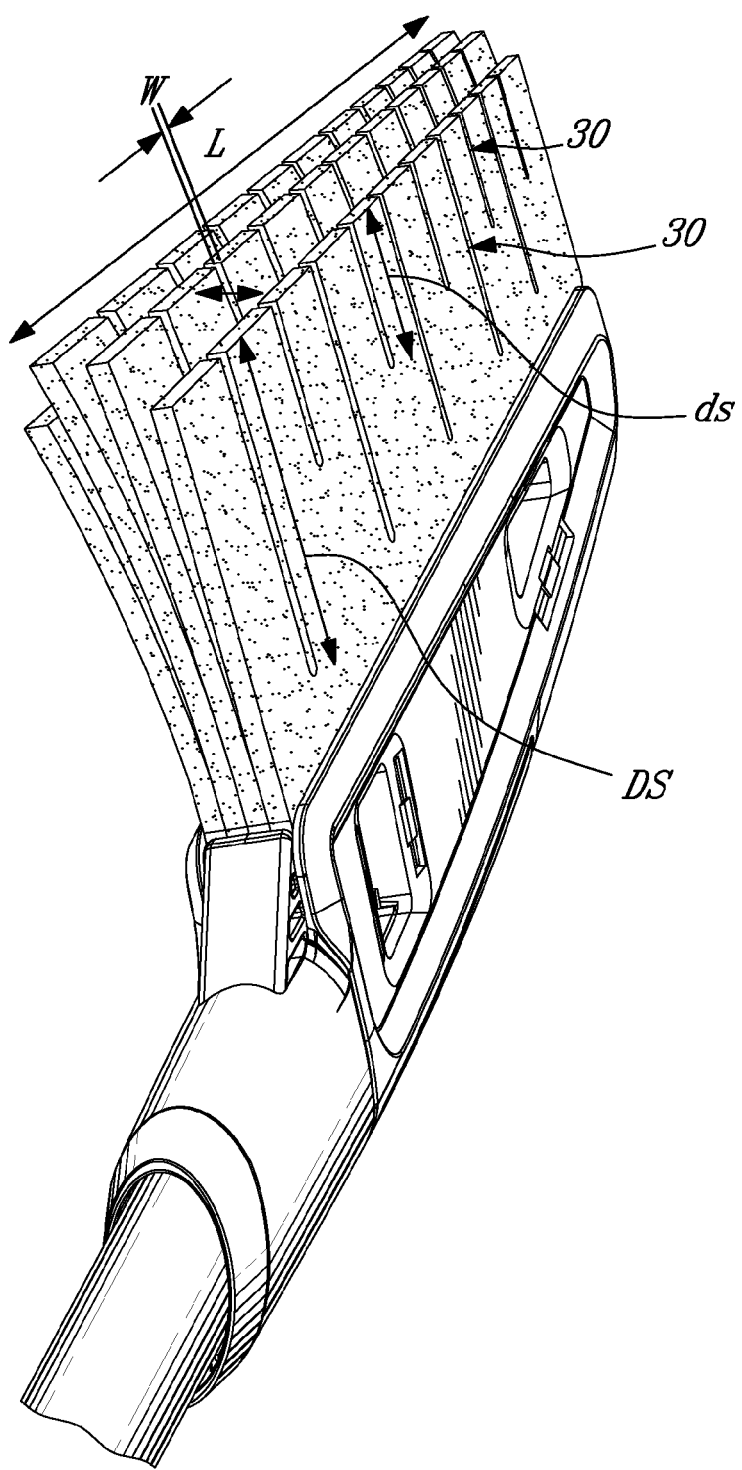
FIG. 2 shows a snow brush according to an embodiment of an aspect of the present invention.

Flexibility of an individual sheet may be tailored by selecting its thickness, and/or selecting its free length, i.e. the distance (see free length FL1 of inner sheet, free length FL2 of outer sheet in FIG. 1) between its edge secured to the handle (H) and its opposed free edge, i.e. its brushing edge, and/or providing the sheet with a cut-out pattern including cut outs or slots 30 as shown in FIGS. 1 and 2 for example, along at least selected part of its length (L). The depth of the slots 30 may be varied (see DS and ds in FIG. 2), as well as the distribution of the slots 30 along the length (L) of each sheet. The width (w) of the slots may also be varied. The slots may be straight slots substantially perpendicular to the brushing edge, or at an angle comprised in a range between 30 and 90 degrees from the brushing edge to allow the brushing edge to conform to irregularity on the surface to be swept. Curved slots may also be provided.

Flexibility of the brush, i.e. of the assembly of sheets, may be tailored by selecting the number of sheets, selecting the material of the different sheets in terms of thickness and density for example, selecting the free length FL of each sheets, combining plain sheets (i.e. without cut out) and slotted sheets: FIG. 3a shows an example with outer slotted sheets 20s sandwiching an inner plain sheet 20f. Outer plain sheets may also be selected to sandwich inner slotted sheets. In case of adjacent slotted sheets, the slots disposition may be offset from one sheet to the next (FIG. 1) in order to have an uninterrupted brushing effect, the tooth formed by the distance between two slots on one sheet sweeping the unswept gap of the slot in the adjacent sheet. FIG. 3b shows an embodiment with a single plain sheet 20f.

Figure 4A:
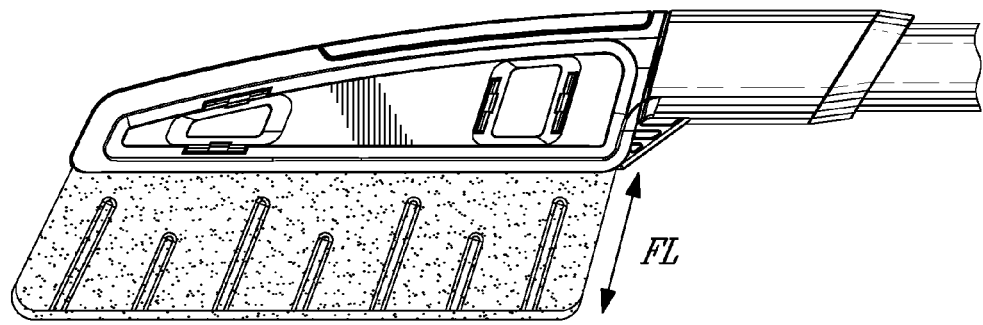
FIGS. 4a and 4b show other embodiments of a snow brush according to the present invention.
Figure 4B:
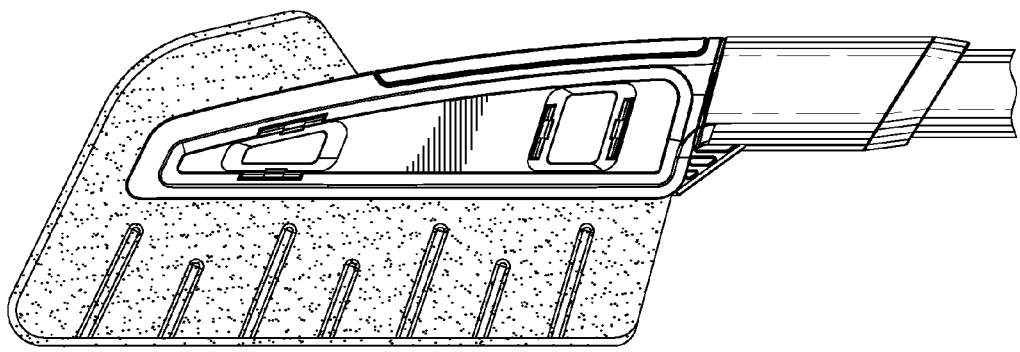
Figure 5A:
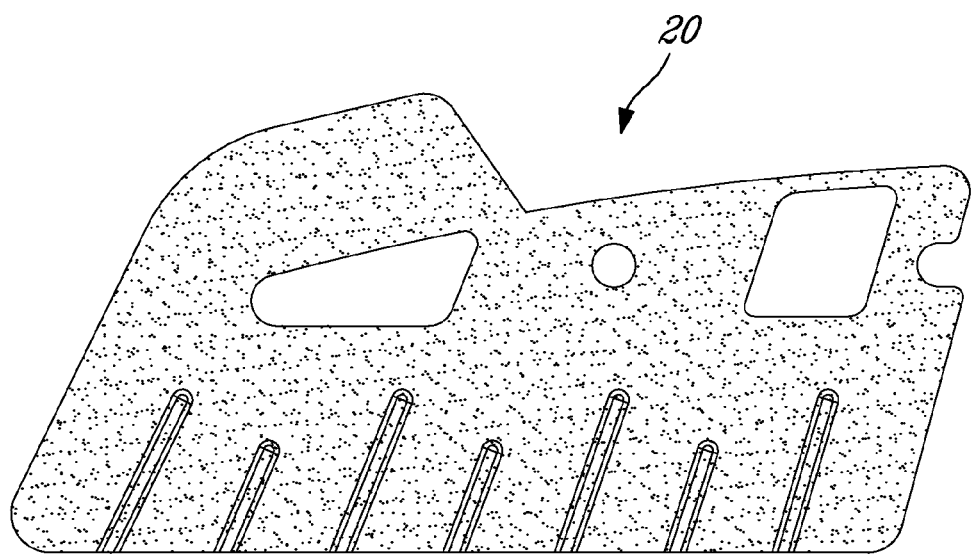
FIGS. 5 show a) top plan view and b) a side view of a foam sheet of a snow brush according to embodiments of an aspect of the present invention.
Figure 5B:
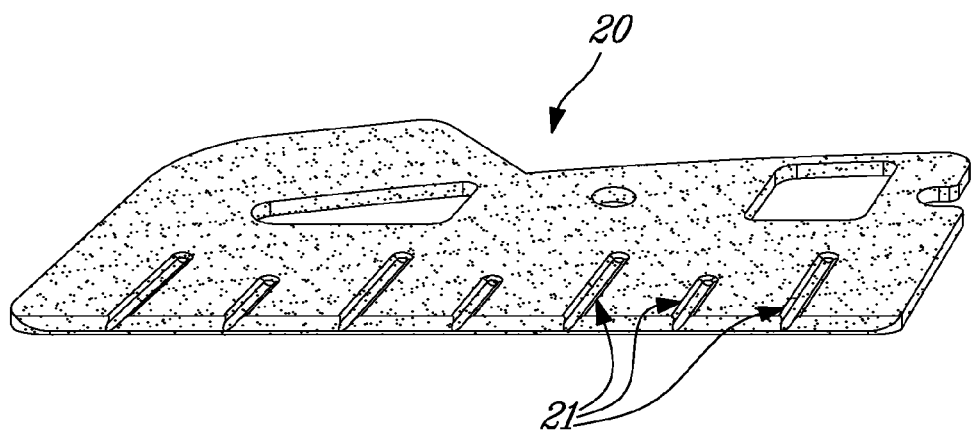
Figure 6:
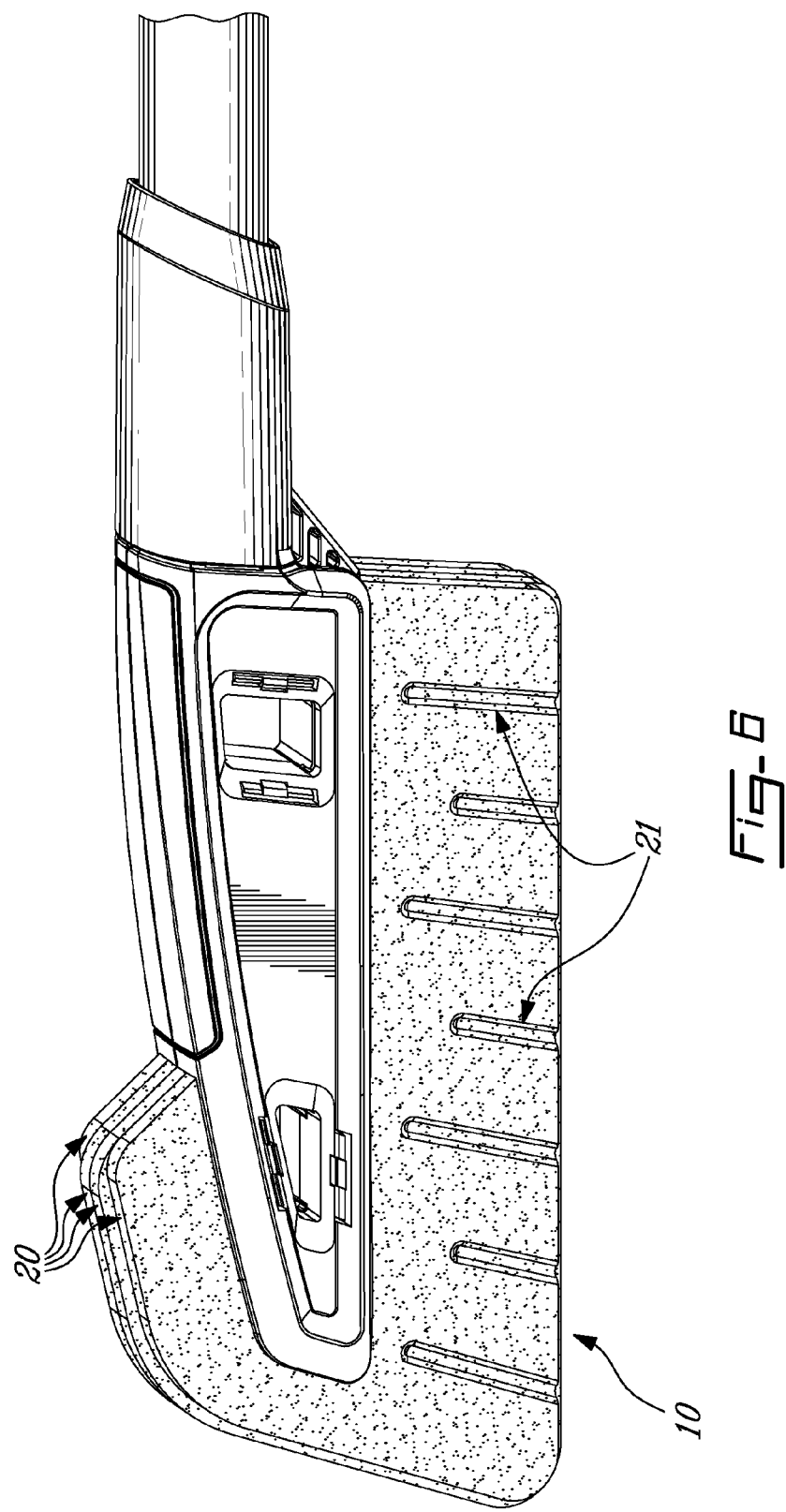
FIG. 6 shows an embodiment of a snow brush according to the present invention.
Figure 7:
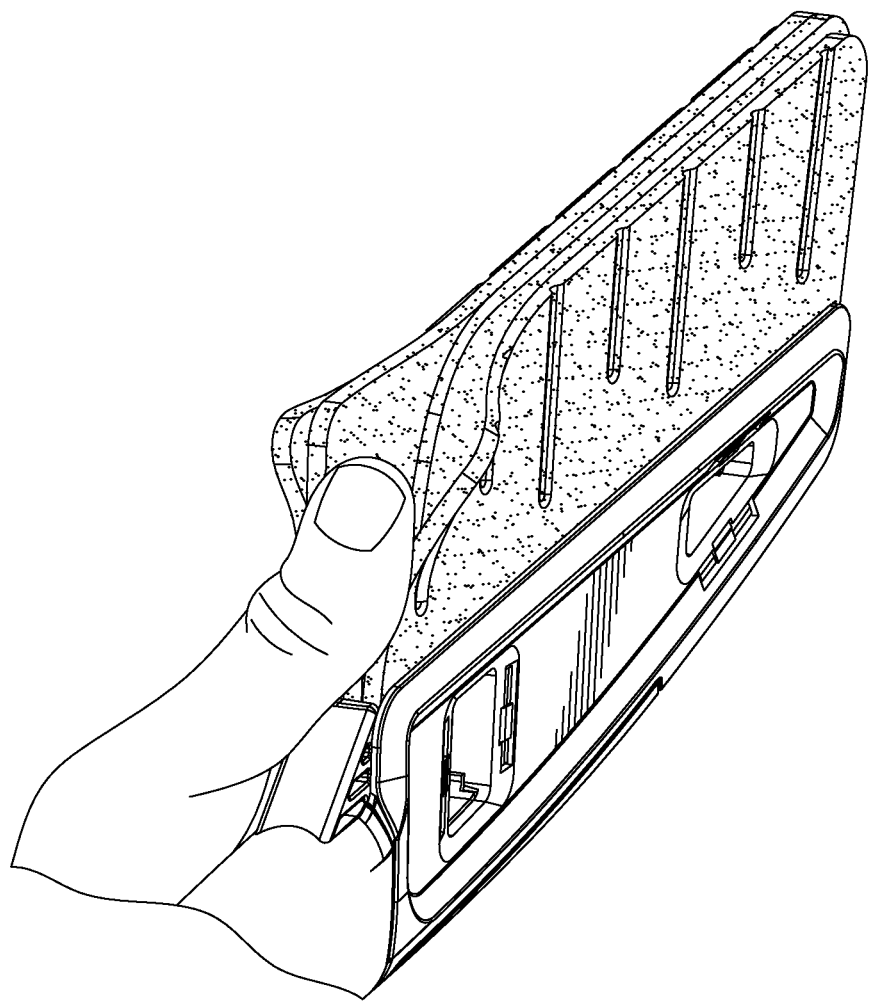
FIG. 7 shows flexibility of a snow brush according to the present invention.

In embodiments shown in FIGS. 4 to 6, the snow brush 10 comprises for example four plain sheets of foam 20, each of a thickness of about 4 mm for example for a total thickness at the brushing edge of about 16 mm for example, and a free length FL of about 50 mm, the two outer sheets 20 being provided with stripes 21, provided by hot-embossing, thereby locally varying the thickness of the sheets.

Typically each foam sheet has a thickness in a range between about 0.5 and 10 mm, allowing flexibility, as shown for example in FIG. 5, when the brush is swept on a surface to be cleaned. The thickness of the brushing edge of the sheets may be reduced, to provide a beveled brushing edge, as shown in FIG. 5b for example.

Foam sheets may alternate with layers of usual bristles rows, such as plastic bristles rows for example.

Typically, the free length at the brushing edge of the sheets may vary from one sheet to another and for a given sheet and is comprised in a range between 10 and 100 mm. In a brush, the free length of each sheet may be different, for example inner sheets having a free length lightly larger than outer layers (See FIG. 1, FL1 larger than FL2). This allows keeping more layers in contact with the surface being swept. The sweeping is then more efficient in both back and forward actions.

The sheets of foam 20 may be secured to the handle (H) using glue, ultrasonic welding, friction welding, push through one-way geometry (FIG. 8), forming a loop (FIG. 9), clamping with a cover attached by screw (FIG. 10), using rivets, melted plastic pins (FIG. 11) or snap hook (FIG. 12) for example.

Figure 8:
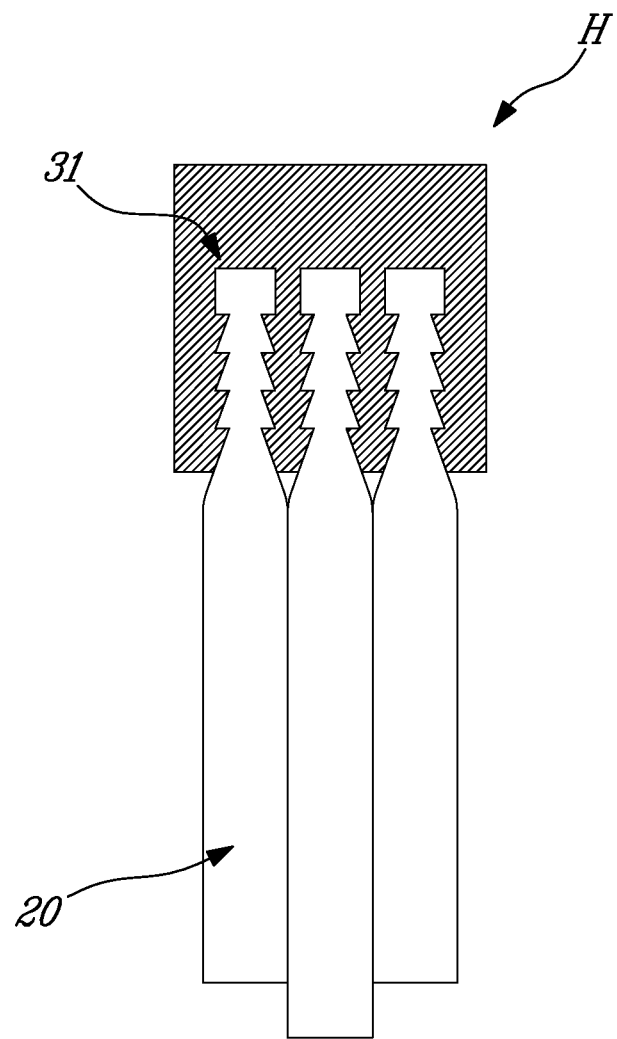
FIG. 8 is a diagrammatic view of fixation of the sheets of the brush to a handle according to embodiments of the present invention.

In an embodiment illustrated in cross section in FIG. 8, the edge 31 of each sheet of foam 20 is pushed through female housings comprising retention teeth provided within the handle body (H).

Figure 9:
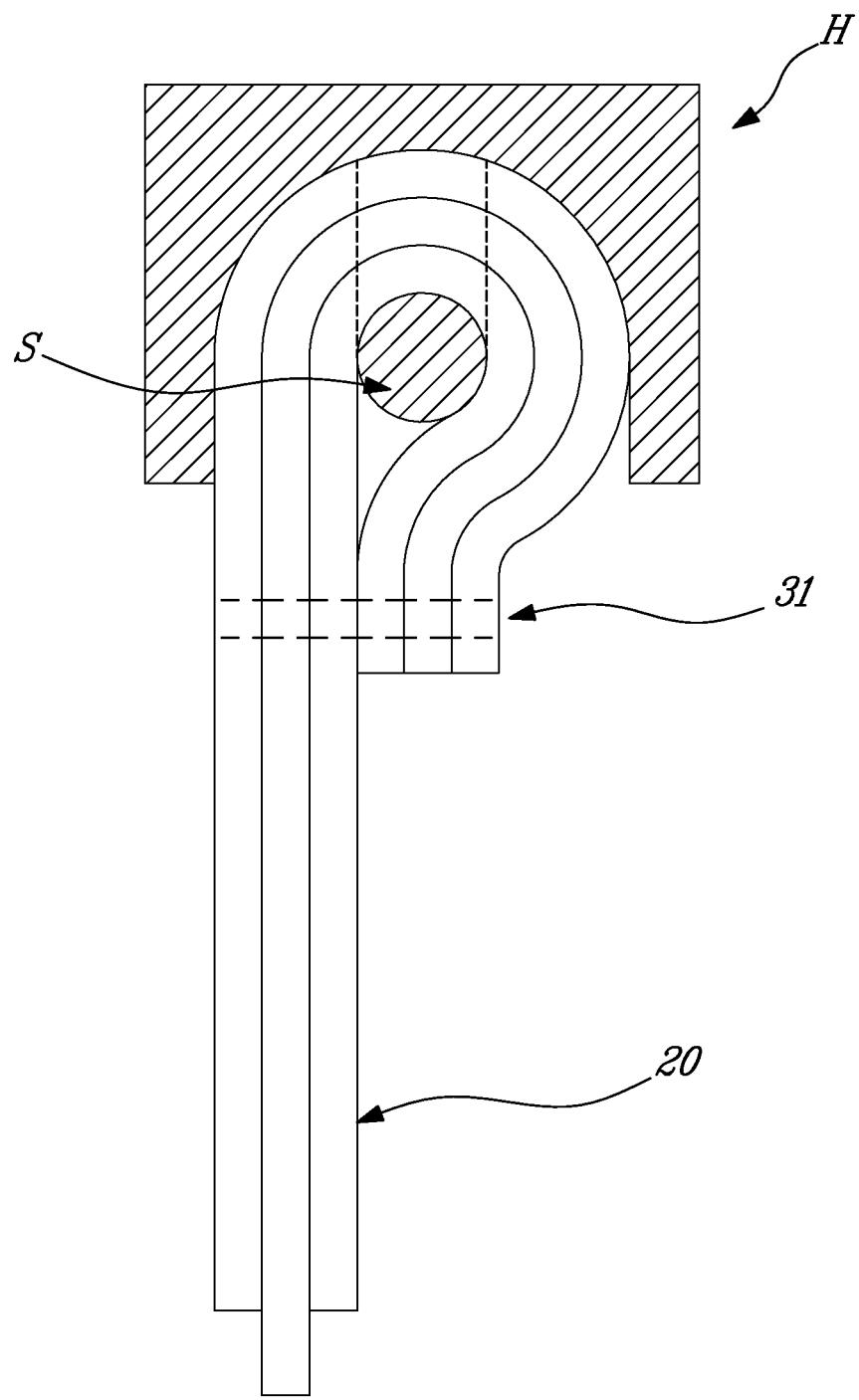
FIG. 9 is a diagrammatic view of fixation of the sheets of the brush to a handle according to embodiments of the present invention.
Figure 10A:
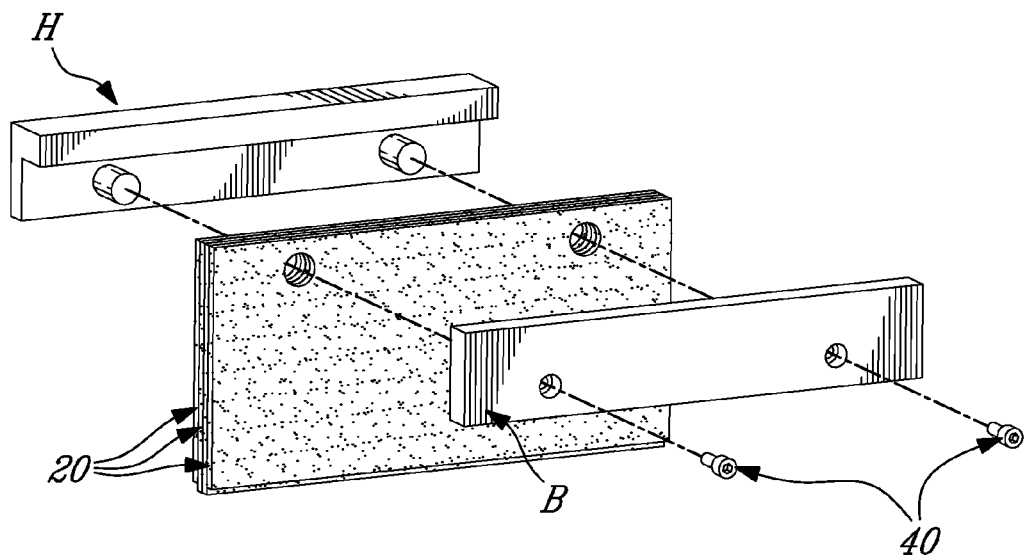
FIGS. 10a-10d are diagrammatic views of steps of a method for fixation of the sheets of the brush to a handle according to embodiments of the present invention.
Figure 10B:
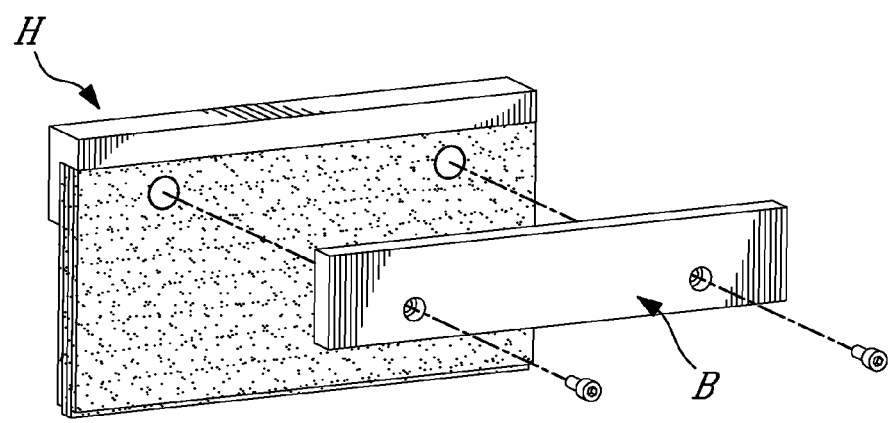
Figure 10C:
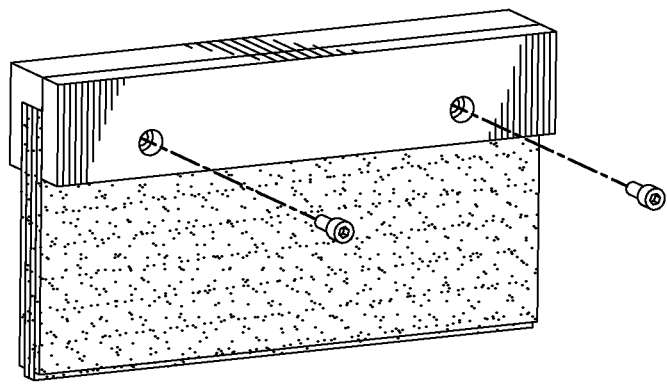
Figure 10D:
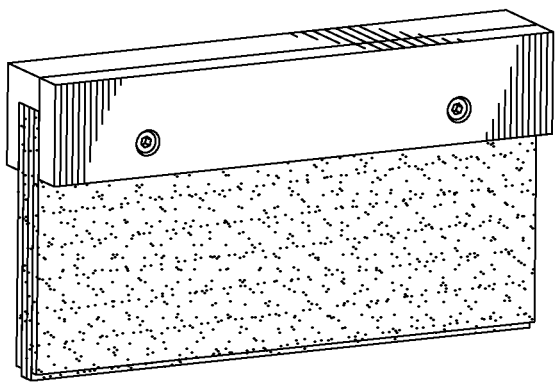
Figure 11A:
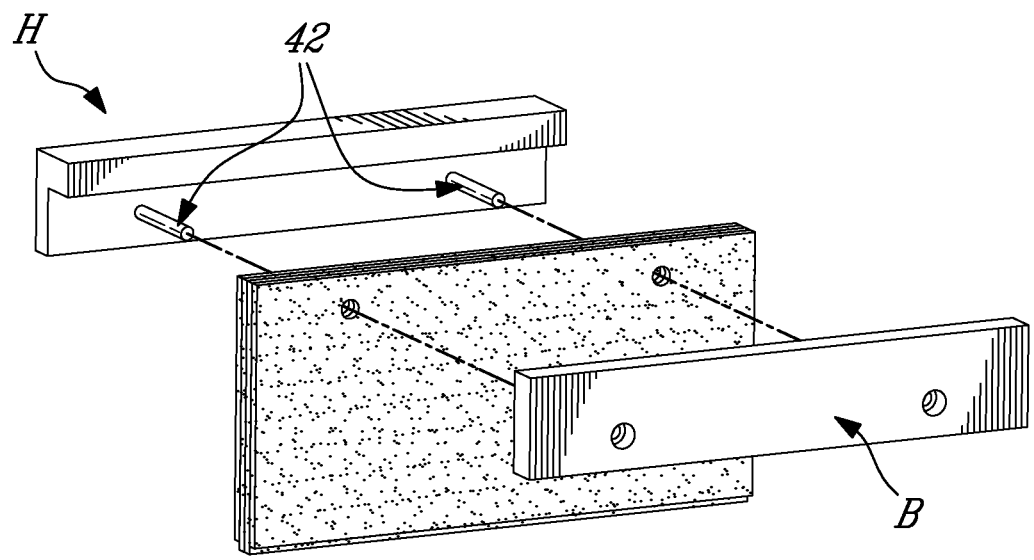
FIGS. 11a-11g are diagrammatic views of steps of a method for fixation of the sheets of the brush to a handle according to embodiments of the present invention.
Figure 11B:
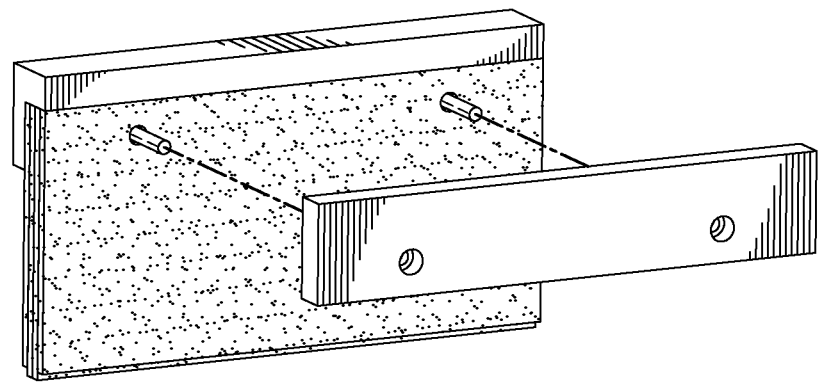
Figure 11C:
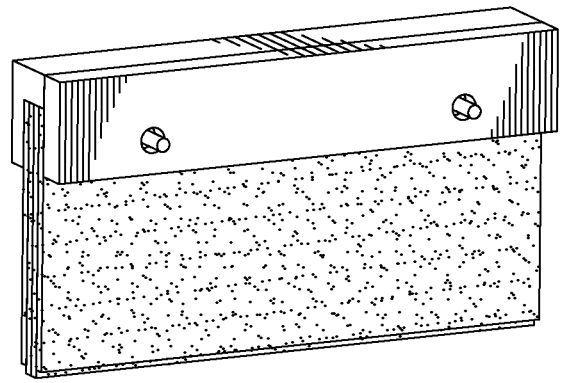
Figure 11D:
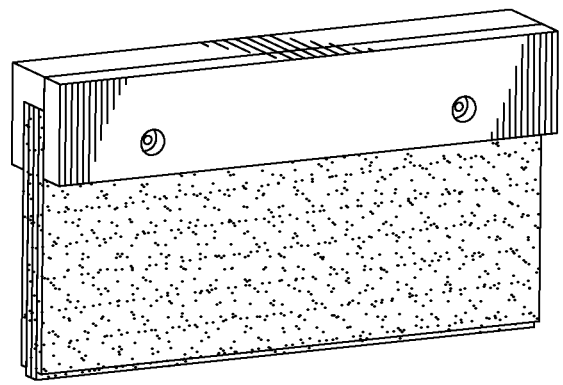
Figure 11G:
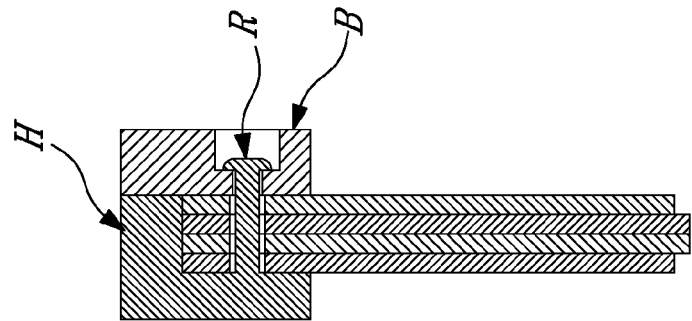
Figure 11F:
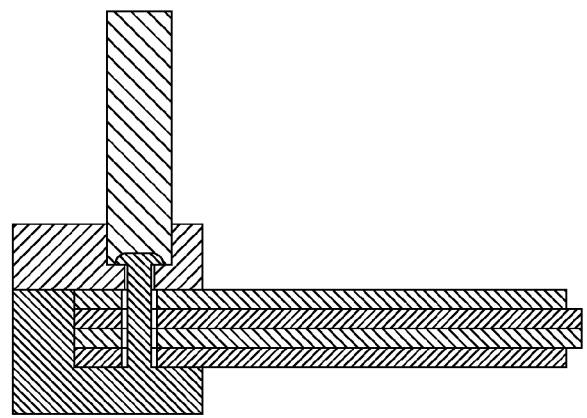
Figure 11E:
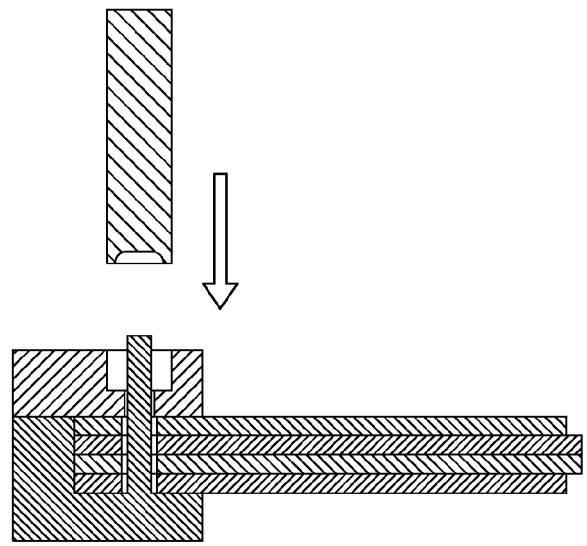

In an embodiment illustrated in cross section in FIG. 9, a supporting element (S), such as a longitudinal rod, is provided within the handle body (H), and the sheets of foam 20 are inserted around the supporting element (S) and their edges 31 tied back in a loop to the sheets 20, by sewing for example.

In an embodiment illustrated in FIGS. 10 and 11, the sheets 20 are clamped between the handle H and a cover B. In FIGS. 10, screws 40 may be used for example. In FIGS. 11, the emerging end of pins 42, on which the sheets 20 are inserted, are melted with a heated tip for example to from rivets R.

Figure 12C:
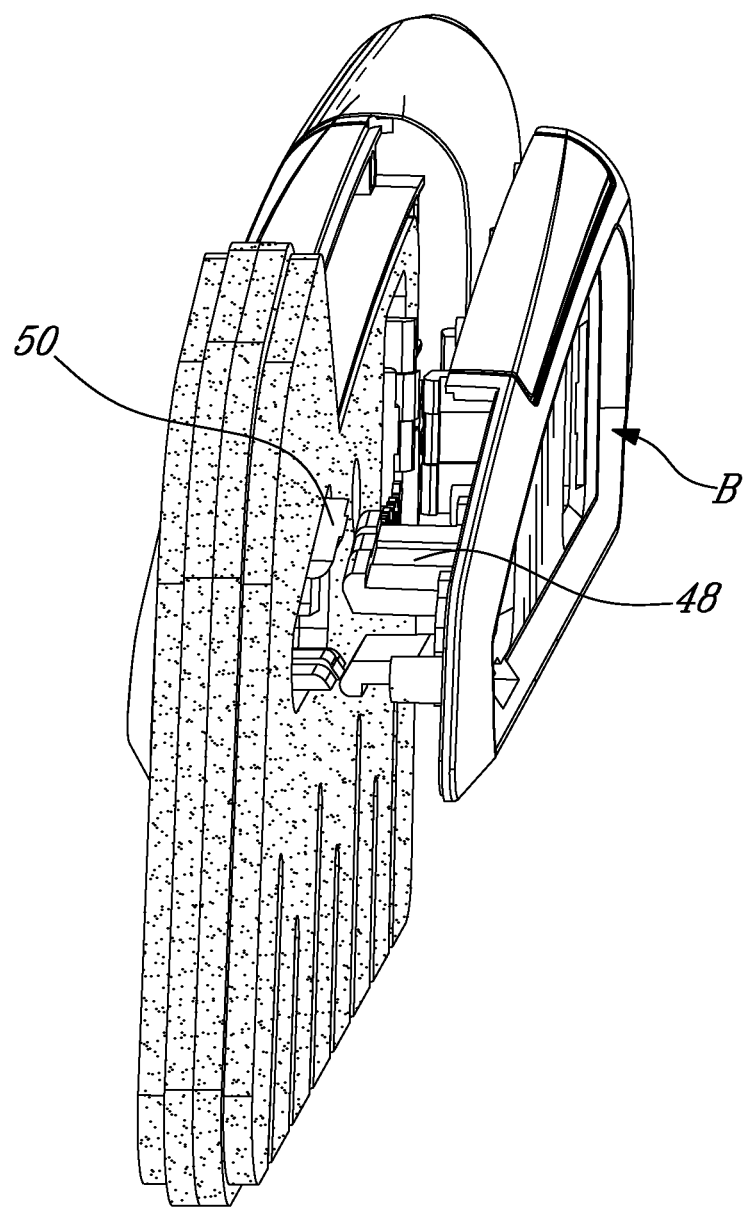

In an embodiment illustrated in FIGS. 12, the body of the handle H comprises openings 44, and the sheets 20 are cut with corresponding openings 46. The sheets 20 are secured between the body H and a cover B comprising locking legs 48 engaging the openings 46 and 44, a free end thereof clipping the outer surface of the handle H (see FIGS. 12c, 12d), thereby locking the sheets 20 in between the handle H and the cover B. Alternatively, the locking legs 48 may be positioned on the handle H and the openings 44 on the cover B.

Figure 13B:
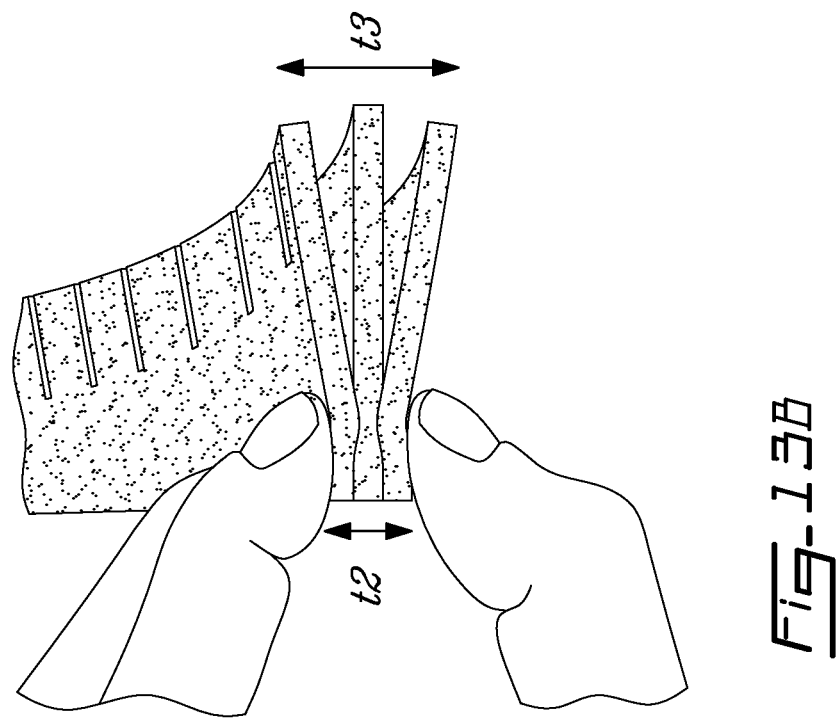
FIGS. 13a) and b) show foam sheets for a brush according to an aspect of the present invention.
Figure 13A:
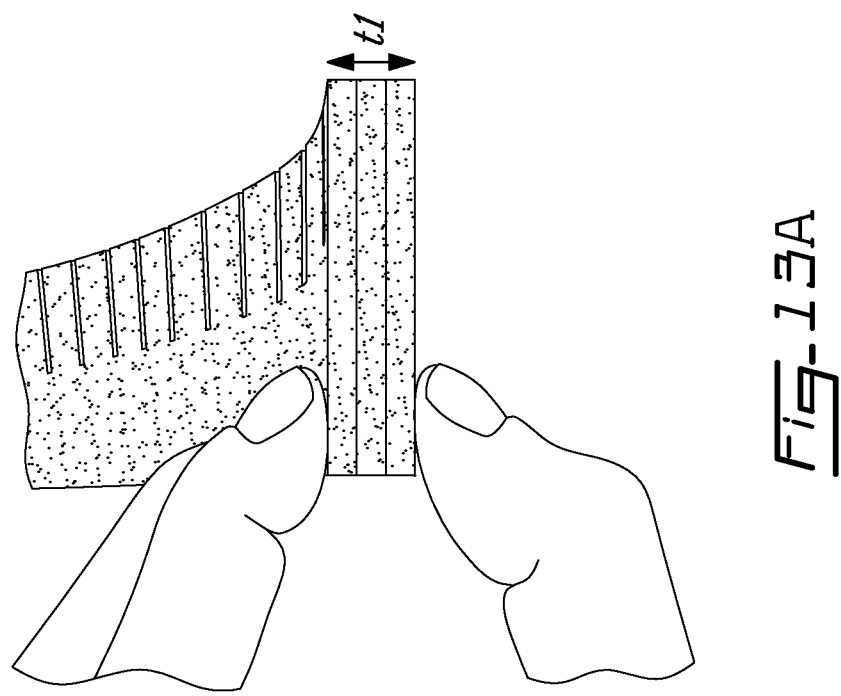

As shown in FIG. 13 for example, the edge where the sheets are attached together and/or to the handle may be squeezed to a thickness t2 smaller than the added thickness t1 of each individual sheet, and the opposite, brushing edge may have a different edge thickness t3.

Compared to a bristle brush, the present brush allows an increased length and flexibility in the geometry of the brushing edge. In contrast to bristle brush, the present brush may provide a continuous brushing edge having curvatures and defining angles. Moreover, the length of the brushing edge is not limited to the free ends of the bristles: all edges of the sheets except the edge used for attachment to the handle provide a brushing edge. In FIGS. 3 for example the lateral edge 35 is designed to provide multiple surfaces, thereby providing a brushing tool with an angled tip portion. The brush illustrated in FIG. 4b for example comprises a first portion extending substantially perpendicular from a first side of the handle (H), continuing into a second portion surrounding the free end of the handle (H) and a third portion on the opposite surface of the handle (H), thereby providing a multiplicity of brushing edges, different brushing angles and brushing surfaces, with a curved angled tip portion. The brush can thus be used to reach recesses in windshields and around side rearview mirrors of a vehicle for example.

The brushing edge may be straight, curved, i.e. concave or convex, dented, i.e. with a zigzag or steps, waved.

The present brush was found to be efficient for removing snow and/or slush and/or water from surfaces such as vehicles' body parts. Contrary to bristles of conventional bristles snow brush, the present brush does not accumulate water or snow or ice. It is non-abrasive on a car paint finish.

The present snow brush is lightweight, and easy to handle, efficient for different body parts from large flat surfaces to complex protruding or recessed surfaces.

Experiments were performed to compare abrasion of conventional bristles brushes and the present brushes, using a glossy painted steel plate and a pneumatic cylinder moving a guided slider, on which the brushes are attached. Each brush was pressed against the plate with a predetermined pressure and the slider was moved back and forth for 1000 cycles. Different tests were performed with the same device: Dry cycles (directly the brush against the plate), wet cycles (water on the plate at the beginning of the test) and dirt cycles (sand on the plate at the beginning of the test).

After of a dry cycle test using a common bristles brush of the prior art on the glossy plate after 1000 cycles, numerous parallel scratches were visible on the plate. After 1000 cycles of this dry cycle test using a flagged bristles brush, i.e. with splits on the bristle end brush, which are known in the art as being less abrasive than straight cut bristles brushes, of the prior art on the glossy plate, a lot of parallel micro-scratches were observed on the plate finish. The same 1000 cycles of this dry cycle test using a brush of the present invention on the glossy plate resulted in some rubbing marks, visible under particular lighting condition, but no scratches were visible on the finished surface of the plate.

For a dirt cycle test using a bristles brush of the prior art on the glossy plate after 1000 cycles, 10 g of sand were deposited in the middle of the pathway on the plate at the beginning of the test. Sand was trapped within the bristles and much more scratches were visible in the middle of the pathway after the test. In a same test with a flagged bristles brush of the prior art, sand was also trapped within the flagged bristles and caused i damage on the finish of the plate. In contrast, with a brush of the present invention, the sand was pushed away at the first strokes and was not trapped within the brush, resulting in less damage to the plate finish.

Wear tests were made to compare resistance to abrasion of standard bristles brushes to brushes of the present invention, by comparing the wear after 5 000 brushing strokes of each brush on a very abrasive (16 large abrasive grains per square inch) sand papered surface, such as a sandpaper 16-grit on the CAMI scale. It was found that the brushing edges of the brushes of the present invention maintained their sweeping performance, i.e. efficiency in removing snow, after such accelerated wear test.

Thus, it was shown that the present brush is efficient for removing snow, slush and water from surfaces such as vehicles' body parts with minimized scratching, and mar.

The scope of the claims should not be limited by the embodiments set forth in the examples, but should be given the broadest interpretation consistent with the description as a whole.

The invention claimed is:

1. A snow brush having multiple continuous brushing edges, said brush comprising plain flexible sheets secured to a handle, edges of the plain flexible sheets forming said continuous brushing edges, each plain flexible sheet having a varying free length comprised in a range between 10 and 100 mm, wherein said plain flexible sheets are plain sheets of closed cells foams of a thickness in a range between 0.5 and 10 mm.

2. The snow brush of claim 1, wherein said plain flexible sheets are sheets of one of: EVA foams, PE foams, rubber foams, TPE foams and silicone foams.

3. The snow brush of claim 1, further comprising slotted flexible sheets.

4. The snow brush of claim 1, further comprising at least one slotted flexible sheet, said flexible plain sheets sandwiching said at least one slotted sheet.

5. The snow brush of claim 1, further comprising slotted flexible sheets, said slotted flexible sheets sandwiching said plain sheets.

6. The snow brush of claim 1, further comprising slotted flexible sheets, a disposition of the slots being offset from one slotted sheet to a next slotted sheet.

7. The snow brush of claim 1, further comprising bristles rows, the plain flexible sheets alternating with layers of bristles rows.

8. The snow brush of claim 1, wherein the plain flexible sheets are secured to the handle by one of: glue, ultrasonic welding, friction welding, push through one-way geometry, tying in a loop, clamping, using rivets, melted plastic pins and snap hook.

9. The snow brush of claim 1, further comprising a cover, a first one of the handle and the cover comprising openings, each plain flexible sheet comprising matching openings, a second one of the handle and the cover comprising locking legs, the locking legs in the second one of the handle and the cover engaging the openings in the first one of the handle and the cover, thereby securing the sheets between the handle and the cover.

10. The snow brush of claim 1, wherein said brushing edges are ones of:
straight, curved, dented, waved and beveled.

11. The snow brush of claim 1, wherein at least one of said plain sheets comprises hot-embossed stripes.

12. A method for fabricating a snow brush having multiple continuous brushing edges, comprising:
selecting flexible sheets of closed cells foams;
securing the flexible sheets to a handle;
wherein said selecting flexible sheets of closed cells foams comprises selecting a number of plain sheets of closed cells foams, and a thickness, a density and a free length of each plain sheet, the thickness being selected in a range between 0.5 and 10 mm, and the free length of each plain sheet varying in a range between 10 and 100 mm.

13. The method of claim 12, wherein said selecting plain flexible sheets of closed cells foams comprises selecting each flexible plain sheets in one of: EVA foam, PE foam, rubber foam, TPE foam and silicone foam.

14. The method of claim 12, wherein said securing flexible sheets to a handle comprises providing openings in a first one of the handle and a cover, cutting matching openings in each plain sheet, providing locking legs in a second one of the handle and the cover, placing the plain sheets between the handle and the cover, and locking the plain sheets into place by engagement of the locking legs of the second one of the handle and the cover in the openings in the first one of the handle and the cover.

* * * * *